United States Patent [19]

Shutov et al.

[11] Patent Number: 4,486,475
[45] Date of Patent: Dec. 4, 1984

[54] METHOD OF MODIFYING WOOD

[75] Inventors: Gennady M. Shutov; Maya E. Erdman; Valery S. Boltovsky; Adel I. Solomakha; Alexandr F. Nosevich; Miroslav E. Pukhalsky, all of Minsk; Vladimir A. Kirichenko; Valentin V. Derbyshkin, both of Krasnodarsky krai, all of U.S.S.R.

[73] Assignee: Belorussky Tekhnologichesky Institut, Sverdlova, U.S.S.R.

[21] Appl. No.: 326,719

[22] Filed: Dec. 1, 1981

[51] Int. Cl.$^3$ .................. B05D 1/18; B05D 3/12; B05D 3/02
[52] U.S. Cl. ..................... 427/351; 427/382; 427/440
[58] Field of Search ............ 427/297, 351, 382, 440

[56] References Cited

U.S. PATENT DOCUMENTS

| | | | |
|---|---|---|---|
| 2,140,981 | 12/1938 | Booty et al. | 427/297 |
| 2,983,629 | 5/1961 | Anderson | 427/298 X |
| 4,301,215 | 11/1981 | Deubzer et al. | 427/297 X |
| 4,303,705 | 12/1981 | Kelso | 427/351 |
| 4,305,978 | 12/1981 | Hager | 427/298 X |

FOREIGN PATENT DOCUMENTS

| | | |
|---|---|---|
| 76347 | 9/1970 | German Democratic Rep. . |
| 1181246 | 2/1970 | United Kingdom . |
| 674904 | 3/1979 | U.S.S.R. . |

OTHER PUBLICATIONS

Shutov: pp. 297–300 of 3rd International Symposium or "Fundamental Studies of Wood from Viewpoint of its Complex Use", Grillenburg, 1980.
Paul EE autoreferate of thesis for title of "Candidate of Sciences", Minsk, 1969, pp. 12–21.

*Primary Examiner*—Michael R. Lusignan
*Attorney, Agent, or Firm*—Ladas & Parry

[57] ABSTRACT

According to the invention, a method of modifying wood comprises the steps of impregnating wood with a modifying system, d drying the impregnated wood in a hydrophobic heat transfer agent, and curing the impregnating system in the wood, the drying and curing processes being carried out in the same autoclave and with the same hydrophobic heat transfer agent, while raising the temperature of the heat transfer agent from 40° to 140° C.

6 Claims, No Drawings

METHOD OF MODIFYING WOOD

FIELD OF THE INVENTION

The present invention is generally concerned with the wood-working industries, and has particular reference to a method of modifying wood.

Modified wood obtained in accordance with the present invention can be utilized as construction material in corrosive environments, thus in cooling towers, venting pipe stacks, mineral fertilizer storage facilities, livestock breeding facilities, and other building and construction projects, for soil-contacting structures and articles, e.g. wooden forms, casting patterns, grapevine stakes, ties and snow retention boards for roads, in machine building and mechanical engineering as substitute for ferrous and non-ferrous metals; in parquet- and ski-making and such like industries as substitute for valuable harder leaf wood species; in the production of sports commodities; as decorative facing and trimming material, for the production of souvenir articles, and so on.

DESCRIPTION OF THE PRIOR ART

In recent times, the problem of modifying wood has gained greatly in importance in view of the wood resources having suffered significant losses in a number of countries and the need being felt for improving the durability of wood products. One leading direction in solving the problem of an overall utilization of wood source materials, a wider usage of softer leaf wood species and birch wood, and expending the scope of application for wood in various industries, is that of modifying wood with synthetic resins and monomers which are introduced as liquids and thereafter converted to solids under the action of heat and chemical reagents.

Known to the prior art is a method of modifying wood, which comprises the step of impregnating wood with an aqueous solution of a thermosetting resin in an autoclave using the vacuum-pressure method, as well as the steps of drying and curing by convective heating (Cf. "Modifikatsiya drevesiny sinteticheskimi polomerami"(Modifying Wood with Synthetic Polymers). Minks, BTI im. S. M. Kirova, 1973, pp. 61–62).

The process of drying and curing is, however, a very lengthy process, and high internal stresses are developed in the wood with the result that a low-quality modifying wood product is obtained.

What is more, the convective heating needs special drying equipment.

There is also known a method of modifying wood (Cf. GDR Pat. No. 76,347, Cl. 38h 2/01, dated June 9, 1969), which method comprises the steps of impregnating wood with an aqueous solution of a thermosetting resin in an autoclave using the vacuum-pressure method, drying the impregnated wood and curing the latter in an open bath of hydrophobic heat transfer agent under an atmospheric pressure and at a temperature above 100° C.

The use of the hot heat transfer agent having a temperature exceeding 100° C. for drying the wood, prevents the escape of moisture from the inner layers of the wood, due to the resin curing process occurring simultaneously, as a result of which the material so obtained features a low quality and has cracks and excess moisture content. Excess moisture, in its turn, affects the polymer curing process, which leads to incomplete polycondensation of the resin, thus deteriorating physical-and-mechanical properties of the modified wood and increasing the material toxicity.

Again, the use of the open heated bath containing the hot heat transfer agent leads to significant releases to atmosphere of harmful low-molecular hydrocarbon products from the heat transfer agent and toxic products from the resin used for wood impregnation.

Another solution to the problem has been proposed in the U.K. Pat. No. 1,181,246 published Apr. 28, 1967, wherein drying is carried out under vacuum in a hermetically sealed autoclave at a temperature of between 60° to 90° C. The temperature of the heat transfer agent is reached gradually to the desired point. There is no provision for circulating the heat transfer agent. On completion of the impregnated wood drying, the heat transfer agent is transfered by pumping from the autoclave into another vessel. Then the autoclave with the impregnated wood contained therein is heated to remove the heat transfer agent from the surfaces of wood specimens and autoclave. The total drying time of the impregnated wood is from 4 to 20 hours. The dried impregnated wood is unloaded and allowed to stand for several days for subsequent curing.

With the drying process carried out as described above, the solvent is removed but partially, there remaining in the wood up to 20% of the total solvent introduced. Since the heat transfer agent is not kept in circulation, complete removal of the solvent from the impregnated wood cannot be realized.

Furthermore, additional time is required for curing the impregnating system in the wood. This is a lengthy process requiring well aired premises of a large floor space area. The drying of the impregnated wood is a 3 to 12 times faster process than the curing of the impregnating system contained therein.

Thus, the above method fails to be used for drying wood impregnated with synthetic resins and for curing the resins therein.

SUMMARY OF THE INVENTION

Therefore, it is an object of the present invention to simplify and intensify the process of wood modification.

Another object of the present invention is to provide a method of modifying wood, permitting to obtain modified wood with improved physical-and-mechanical properties.

A further object of the present invention is to provide a method of modifying wood, permitting to reduce the energy costs and to improve the labor conditions.

With these and other objects in view, there is provided a method of modifying wood, comprising the steps of impregnating wood with a modifying system, drying the impregnated wood in an autoclave using a hydrophobic heat transfer agent, and curing the modifying system in the wood, wherein, according to the invention, the step of curing is performed, under vacuum, in that same autoclave and using that same hydrophobic heat transfer agent as used for drying, while raising the temperature of the heat transfer agent from 40° to 140° C.

The hereinproposed method of modifying wood makes it possible to remove completely the solvent from the wood prior to the formation of polymeric products in the wood, whereby modified wood with high physical-and-mechanical properties is obtained.

What is more, the provision of the modifying process conducted in the closed vessel, namely in autoclave, makes possible to obviate the release to atmosphere of harmful low-molecular hydrocarbon products from the hydrophobic heat transfer agent and toxic products from the resin used for wood modification.

It is advisable that the steps of drying the impregnated wood and curing the modifying system in the wood be performed using the hydrophobic heat transfer agent kept in continuous circulation.

Continuous circulation of the hydrophobic heat transfer agent permits the drying time to be substantially reduced and allows the heat transfer agent to be used repeatedly.

The hydrophobic heat transfer agent that can be suitably used include silicone fluids and saturated and-/or unsaturated hydrocarbons having a melting point of not higher than 30° C. and a flash temperature of not lower than 180° C.

The use of silicone fluids, and saturated and/or unsaturated hydrocarbons having a melting point of 30° C. maximum and a flash temperature of 180° C. minimum, makes it possible to perform the step of curing the modifying system in the wood at a temperature not exceeding 140° C. The difference between the curing temperature and the flash temperature of the hydrophobic heat transfer agent is 40° C., which assures safe labour conditions.

The present invention will be more fully understood from the detailed description of its embodiments that follows.

DETAILED DESCRIPTION OF THE INVENTION

Wood specimens of predetermined dimensions with a moisture content of 6 to 14%, are loaded into an autoclave and impregnated with an aqueous solution of phenol-formaldehyde resin, specifically with phenolic alcohols as an intermediate product in the formation of A-stage phenol-formaldehyde resins, by the vacuum-pressure method.

Next, the impregnated wood enclosed in the hermetically sealed autoclave is dried under vacuum using a hydrophobic heat transfer agent which can be selected from among silicone fluids or saturated and/or unsaturated hydrocarbons, specifically from various oils and other compounds, having a melting point of 30° C. maximum, and a flash temperature of 180° C. minimum.

When using compounds having a melting point of not higher than 30° C. and a flash temperature of not lower than 180° C., the temperature of the hydrophobic heat transfer agent at the first stage of drying is 40° to 75° C. In the course of drying, the temperature of the hydrophobic heat transfer agent and the temperature of the inner layers of the specimens are monitored by means of chromel-copel thermocouples connected to a recording potentiometer.

The drying time at the first stage to a moisture content of 25 to 30% is 2 to 3.5 hours. The moisture content of the impregnated wood is determined using the Dean and Stark method. On the wood specimens reaching the specified moisture content, the temperature of the hydrophobic heat transfer agent is raised up to 85° C. Drying is continued under vacuum using the hydrophobic heat transfer agent kept in circulation until the moisture content reaches 6 to 8%. This makes it possible to use the heat transfer agent repeatedly.

Curing of the phenolic alcohols contained in the wood is performed raising the temperature up to 140° C. for a period of 1 to 3 hours.

The quality of the modified wood so obtained is characterized by presence or absence of warpage and cracks, by physical-and -mechanical properties of the materials, and by moisture content.

The modified wood obtained by the hereinproposed method features a high-degree of cure (97.0 to 98.5%), a low moisture content (3 to 4.5%) and high quality.

This metod of modifying wood affords higher rates of wood modification under commercial production conditions, cutting down the time required for modification by using wood with varying initial moisture content, eliminating the need for washing the equipment after each cycle, obviating the need for cycle-to-cycle pumping of the impregnating system and triple evacuation of the autoclave. Energy costs are reduced considerably as well. Carrying out the process in a hermetically sealed equipment contributes to better conditions and precludes toxic released to the surrounding atmosphere.

Given below are typical Examples illustrating the present invention in certain aspects and bringing out more clearly the features and advantages specific to it.

EXAMPLE 1

Wood speciments pre-dried to a moisture content of 6 to 10% were loaded into an autoclave and impregnated with an aqueous solution of phenolic using the vacuum-pressure method. Next, the impregnated wood contained in the hermetically sealed autoclave was treated with a hydrophobic heat transfer agent, namely, compressor oil having a flash point of 210° C. at a residual pressure of 6.5 KPa and with the heat transfer agent kept constantly in circulation. The temperature of the heat transfer agent at the first drying stage was 40° C. The drying process was carried out with the temperature of the heat transfer agent being monitored.

The first drying stage was continued until the moisture content of the wood reached 25° to 30° C. The wood speciments having attained the specified moisture level, the temperature of the heat transfer agent was raised to 70° C. Drying was then continued, to a moisture level of 6° to 8° C, under constant vacuum and with the heat transfer agent in circulation. The phenolic alcohols contained in the wood were cured at a temperature of 110° C. The degree of cure of the phenolic alcohols was 97.2%. The moisture content of the modified wood was 3.6%. The quality of the modified wood was characterized by the absence of warpage and cracks.

EXAMPLE 2

This was different from Example 1 in that diesel oil having a flash temperature of 200° C. was used for drying the wood and curing the phenolic alcohols contained therein, under vacuum with a residual pressure of 10 kPa.

The temperature of the heat transfer agent was 75° C. at the first stage and 85° C. at the second stage. The curing temperature was 125° C. The degree of cure of the phenolic alcohols was 97.73%. The moisture content of the modified wood was 4.2%. The quality of the modified wood was characterized by the absence of warpage and cracks.

EXAMPLE 3

This was different from Examples 1 and 2 in that a silicone fluid was used for drying the wood and curing the phenolic alcohols contained therein, under vacuum with a residual pressure of 14.6 kPa. The temperature of the heat transfer agent was 75° C. at the first stage and 85° at the second stage. The curing temperature was 135° C.

The degree of cure of the phenolic alcohols was 98.2%. The moisture content of the modified wood was 3.8%. The quality of the modified wood was characterized by the absence of warpage and cracks.

The test data signify that wood modification by the proposed method allows of increasing, compared to the prior-art method, ultimate flexural strength by 8.6% and ultimate compressive strength in the fiber direction by 29%. The wood modified by the proposed method shows a lower swelling, as compared to the wood modified by the prior-art method, and a lower water absorption. Wood specimens modified by the proposed method were subjected to washing in running water for month and re-tested for physical-and-mechanical properties. The test results obtained remained practically unchanged which is the evidence of high quality of the wood modification process.

In describing the above examples of various embodiments of the present invention, a limited specific terminology has been used for greater clarity. It will be understood, however, that the present invention is by no means restricted by the terminology adopted herein and that each of the terms used covers all equivalent elements such as may serve the same functions and be used to solve the same problems.

Although the present invention has been described herein with reference to the preferred typical embodiments thereof, it will be apparent to those skilled in the art that there may be minor modifications made in the procedures comprised in the proposed method of modifying wood.

All such modifications and variations are contemplated to be embraced in the spirit and scope of the invention, as defined in the appended claims.

What is claimed is:

1. A method of modifying wood, comprising the following steps:
   impregnating wood with a modifying system,
   drying the impregnated wood in an autoclave using a hydrophobic heat transfer agent, and
   curing the modifying system in the wood, the steps of drying and curing being performed under vacuum in the same autoclave and using the same hydrophobic heat transfer agent, while raising the temperature of the heat transfer agent from 40° to 140° C.

2. A method as claimed in claim 1, wherein the steps of drying the impregnated wood and curing the modifying system in the wood are carried out using the hydrophobic heat transfer agent kept constantly in circulation.

3. a method as claimed in claim 1, wherein the hydrophobic heat transfer agent is selected from the group consisting of: silicone fluids, saturated and unsaturated hydrocarbons having a melting point of not higher than 30° C. and a flash temperature of not lower than 180° C.

4. A method of modifying wood, comprising the following steps:
   impregnating wood with a modifying system,
   drying the impregnated wood in an autoclave using a hydrophobic heat transfer agent, and curing the modifying system in the wood,
   the steps of drying and curing being performed under vacuum in the same autoclave and using the same heat transfer agent, the temperature of the heat transfer agent being in the range 40° to 85° C. for the drying stage and raised to a temperature of 110° to 140° C. for the curing stage.

5. A method according to claim 4 wherein said drying is effected in two stages, the first at a temperature of 40° to 75° C. and the second at 85° C.

6. A method according to claim 5 wherein said first stage drying at 40° to 75° C. is carried on for such a duration as to lower the moisture content to 25 to 30%.

* * * * *